United States Patent
Thompson et al.

(10) Patent No.: US 10,002,550 B1
(45) Date of Patent: Jun. 19, 2018

(54) SYSTEM FOR REDUCING THE RELEASE VALUE OF A LABEL

(71) Applicant: ODDS, LLC, Charlotte, NC (US)

(72) Inventors: Paul Thompson, Charlotte, NC (US); John Roberts, Charlotte, NC (US)

(73) Assignee: Odds, LLC, Charlotte, NC (US)

( * ) Notice: Subject to any disclaimer, the term of this patent is extended or adjusted under 35 U.S.C. 154(b) by 0 days. days.

(21) Appl. No.: 15/043,821

(22) Filed: Feb. 15, 2016

(51) Int. Cl.
  *B31D 1/02* (2006.01)
  *G09F 3/10* (2006.01)
  *B65C 9/18* (2006.01)
  *G09F 3/02* (2006.01)
  *C09J 7/02* (2006.01)

(52) U.S. Cl.
  CPC ............ *G09F 3/10* (2013.01); *B31D 1/021* (2013.01); *B65C 9/18* (2013.01); *C09J 7/02* (2013.01); *G09F 3/02* (2013.01); *C09J 2201/606* (2013.01); *C09J 2203/334* (2013.01); *G09F 2003/0241* (2013.01)

(58) Field of Classification Search
  CPC ..................................... B31D 1/021
  USPC ........................................ 156/152
  See application file for complete search history.

(56) References Cited

U.S. PATENT DOCUMENTS

| | | | | |
|---|---|---|---|---|
| 5,591,290 A | * | 1/1997 | Walter | C09J 7/0207 156/152 |
| 8,540,839 B2 | * | 9/2013 | Zietlow | B31D 1/022 156/152 |
| 2008/0032081 A1 | * | 2/2008 | Gelsinger | B31D 1/021 428/40.1 |
| 2011/0226405 A1 | * | 9/2011 | Nishida | B32B 37/24 156/152 |
| 2012/0088051 A1 | * | 4/2012 | Holbert | B32B 7/06 428/41.3 |
| 2014/0246140 A1 | * | 9/2014 | Mallett | B32B 38/10 156/152 |
| 2017/0232633 A1 | * | 8/2017 | Green | B26F 1/44 156/250 |
| 2017/0243523 A1 | * | 8/2017 | Potter | B31D 1/021 |

\* cited by examiner

*Primary Examiner* — Mark A Osele

(57) ABSTRACT

A system for producing a roll of label material with a reduced release value. The system includes a separating apparatus configured to separate an initial label roll into two portions including an adhesive coated portion and a release agent coated portion. The system also includes an advancing apparatus configured to maintain the two separated portions apart and advance the portions toward a combining apparatus, which is configured to combine the two portions into a final label roll having a release value lower than the release value of the initial roll of label material.

14 Claims, 5 Drawing Sheets

| Sample # | Release | |
|---|---|---|
| 1 | 24.7 | grams |
| 2 | 24.4 | grams |
| 3 | 22.3 | grams |
| 4 | 21.9 | grams |
| 5 | 23.7 | grams |
| 6 | 28.5 | grams |
| 7 | 24.1 | grams |
| 8 | 18.9 | grams |
| 9 | 28.6 | grams |
| 10 | 28.0 | grams |
| 11 | 22.7 | grams |
| 12 | 39.1 | grams |
| 13 | 37.6 | grams |

| Sample # | Release | |
|---|---|---|
| 14 | 32.6 | grams |
| 15 | 30.6 | grams |
| 16 | 27.5 | grams |
| 17 | 37.3 | grams |
| 18 | 19.1 | grams |
| 19 | 18.7 | grams |
| 20 | 29.7 | grams |
| 21 | 24.1 | grams |
| 22 | 23.3 | grams |
| 23 | 24.0 | grams |
| 24 | 31.5 | grams |
| 25 | 28.1 | grams |

Average Release    26.8    grams
Standard Deviation    5.6    grams

FIG 8

| Sample # | Release | |
|---|---|---|
| 1 | 16.9 | grams |
| 2 | 16.2 | grams |
| 3 | 16.1 | grams |
| 4 | 20.2 | grams |
| 5 | 18.0 | grams |
| 6 | 26.5 | grams |
| 7 | 21.0 | grams |
| 8 | 17.1 | grams |
| 9 | 27.4 | grams |
| 10 | 16.4 | grams |
| 11 | 24.3 | grams |
| 12 | 20.2 | grams |
| 13 | 15.8 | grams |

| Sample # | Release | |
|---|---|---|
| 14 | 14.4 | grams |
| 15 | 17.4 | grams |
| 16 | 22.5 | grams |
| 17 | 22.8 | grams |
| 18 | 19.9 | grams |
| 19 | 21.7 | grams |
| 20 | 20.3 | grams |
| 21 | 20.1 | grams |
| 22 | 21.9 | grams |
| 23 | 21.8 | grams |
| 24 | 18.9 | grams |
| 25 | 17.1 | grams |

Average Release    19.8    grams
Standard Deviation    3.3    grams

FIG 9

SYSTEM FOR REDUCING THE RELEASE VALUE OF A LABEL

The present application relates to adhesive labels and methods of manufacturing customized adhesive labels from a stock roll of label material.

BACKGROUND

Pressure sensitive labels are typically constructed with a base layer of linear material, a release agent, a layer of adhesive and the face stock material upon which is printed any desired information. Labels are converted and supplied to end users on rolls. During conversion, the rolls of labels are loaded into automatic label applicators, where they are threaded around rollers, through sensors, through printing devices to a peel edge (sometimes referred to as peel bar, peel plate, dispense edge, etc.). From the peel edge, the labels are removed and the base layer of linear material continues through a roller drive to a linear rewind. A label applicator is used to feed and dispense the labels. The label is applied to the product by pressing the label onto the product.

A common problem associated with label application relates to the way that labels dispense from the peel edge. Manufacturers of label applicators have provided many different features in the applicator machines in an effort to facilitate the release of the labels from the silicone coated base layer of linear material as the labels dispense off the peel edge. In order for a label applicator to work reliably the labels need to dispense consistently, preferable straight off the peel edge, as the label is typically being feed onto an application pad, before being applied to a product.

Some manufacturers produce machines that have very sharp peel edges in an attempt to ensure consistent separation of the label from the linear base layer. However, if the peel edge is too sharp it can tear the linear material. In another example, some applicator machines include spring pressure plates on top of the label to apply pressure and/or drag to the label before it is dispensed. Other applicator machines may include air jets to assist in directing the label off the linear material as needed. All of the aforementioned modifications to applicator machines require the operator to make critical adjustments to the equipment in order for the label to dispense consistently. As different rolls of labels are loaded in the automatic applicator machines, the operator is forced to adjust the machines accordingly, at times without success and, as a result, an entire roll of labels must be discarded, adding cost to the final product. Thus, there remains a need for a reliable and cost efficient way of ensuring consistent separation of the label from the layer of linear material.

BRIEF DESCRIPTION OF THE DRAWINGS

Features, aspects, and advantages of the present invention will become apparent from the following description, appended claims, and the accompanying exemplary embodiments shown in the drawings, which are briefly described below.

FIG. 8 is a chart of release values for conventional labels.

FIG. 9 is a chart of release values for labels constructed according to an embodiment of the invention.

DESCRIPTION

Various features of the present invention will be described with reference to the drawings. Like numbers are used throughout the drawings to refer to the same or similar parts and in each of the embodiments of the invention hereafter described.

As described herein, the invention is directed generally to a label that releases from the underling linear material consistently, while still maintaining excellent adhesion. For example, a roll of labels, with the label release force reduced, is configured to allow the labels to peel off the linear more consistently when dispensed via an automatic label applicator. The scope of the invention includes various arrangements of labels such as sheets or strips of labels. A sheet or strip of labels may be rolled for transport and use with convertor and applicator equipment, as described herein.

Figure 2:
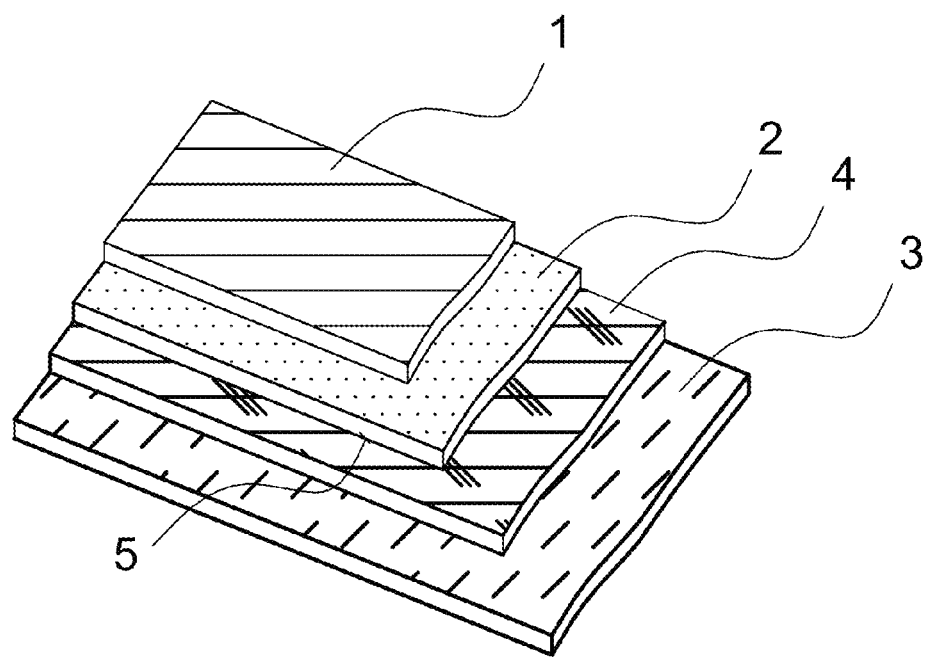
FIG. 2 is an exploded view of an embodiment of a portion of label material.
Figure 7:
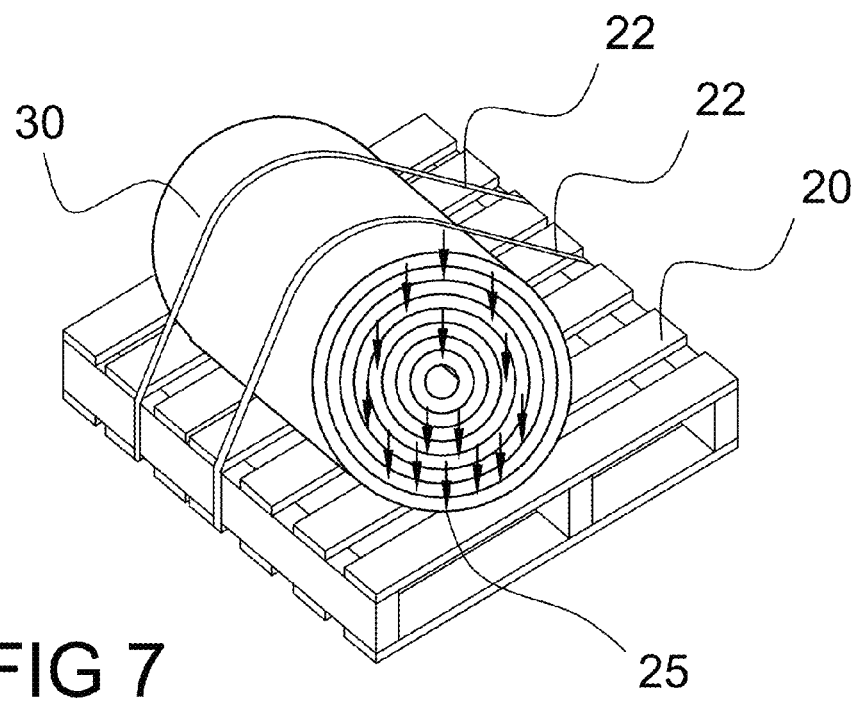
FIG. 7 is perspective view of a master roll of conventional label stock.

Rolls of labels are generally converted on high speed label presses. As shown in FIG. 7, a master roll 30 of label stock is converted into labels to be applied to a product. As shown in FIG. 2, the label stock material generally includes a base layer of linear material 3 (sometimes referred to as the carrier). The linear material may be paper, film or any medium suitable for supporting the label material. The linear material is covered with a release agent 4, typically silicone. The release agent maybe sprayed onto or rolled onto the linear material. The release agent 4 is applied to prevent an adhesive 2 from sticking to the linear material 3. The release agent forms a liner layer on the linear material.

The layer of adhesive 2, which typically sprayed over the release agent 4, may be a cold glue, a rubber glue, an acrylic glue or any suitable adhesive material. During assembly of the master roll of label materials, the label face stock material 1 is rolled on to the top of the adhesive 2 by passing the layers through a series of rollers, with varying degrees of pressure, varying ambient temperatures, varying humidity and then wound to form on a master roll.

As the master roll 30 is wound, it is not uncommon for the label face stock material located in the center of the roll to be connected to the base layer with more adhesive force due to the weight of the roll. At the outer regions of the master roll, the adhesive force may be reduced. Also, adhesive force may vary due to temperature and the uniformity of the adhesive layer. In addition, the master roll 30 is normally placed on a pallet 20 and is strapped down 22 and shipped to the converter. While on the pallet, the weight 25 of the rolled up roll 30 causes some variation in the adhesive force between the label stock and the linear material. The bottom of the roll has all the weight of the roll, while the top only carries the weight of a few layers of labels. The varying pressure associated with the weight may cause varying adhesive force between he label and the linear base layer. Thus, as a result of these and possibly other factors the adhesive force between the face stock 1 and the linear material 3 may vary throughout a roll.

As described below, the present application discloses a label material that provides for consistent release of the label from the linear base material. In general, the label is formed by separating the adhesive 2 and face stock 1 layers from the linear material 3 and release agent 4. After separation, the layers are recombined in manner generating less and more consistent pressure. This innovative process produces a roll of labels that yields for an easier and more consistent release of the label from the linear material.

Figure 1:
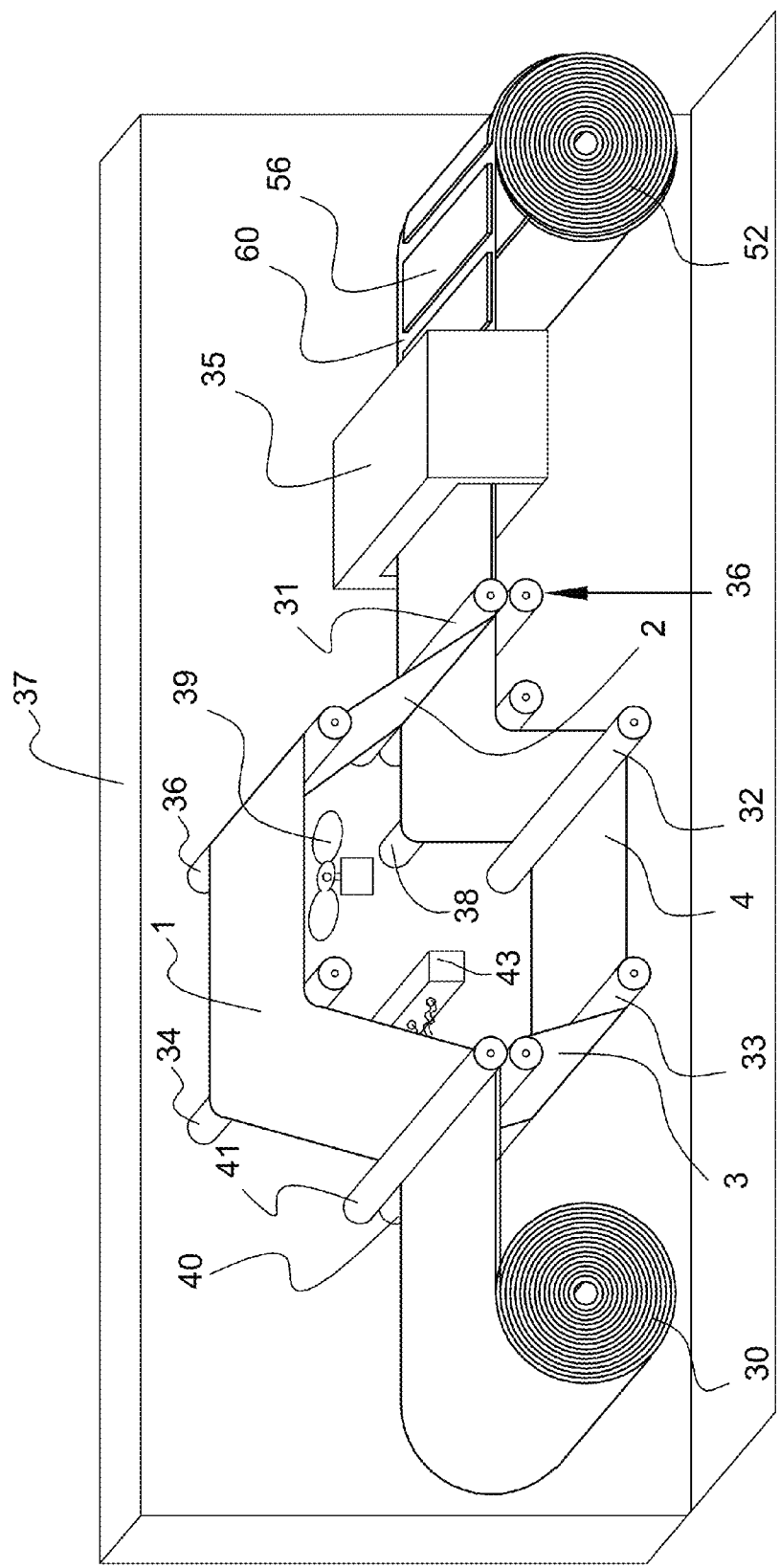
FIG. 1 is a perspective view of a an embodiment of a label converting press to separate and then combine back together a base layer of linear material and the face stock material.

As shown in FIG. 1, according to an exemplary embodiment, a master roll of label stock 30 is loaded into a specially designed converting press 37. The label stock 30 is threaded through the machine, when the stock material has reached the separating section of the converting press the label stock material 30 is separated into two sections. The converting press includes a separation apparatus that maintains a separation between the face stock 1 and adhesive material 2 from the linear material 3 and release agent 4. The separation apparatus includes rollers 40, 41 that carry each of the two separated portions away from the feeding stock material 30. As shown in FIG. 1, the stock on a master roll is loaded onto the converting machine or press and threaded to rollers 41, 40. The separation occurs as the face stock 1 and adhesive material 2 travel around roller 41 and up to roller 34, while the linear material 3 and release agent 4 travel around roller 40 and down to roller 33, pulling the two materials apart.

The press also includes an advancing apparatus for carrying the separated face stock material 1 and the linear base material 3 through the press in a separated position. The advancing apparatus portion of the press includes at least a pair of rollers 34, 36 for carrying the face stock material 1 and at least a pair of rollers 33, 32 for carrying the linear material 3. The advancing apparatus may also include an additional roller 38 for repositioning the linear material in a horizontal position in advance of entering a combining apparatus. The combining apparatus may include a pair of rollers 31, 36 through which both the face stock material 1 and the linear material 3 are married back together. The rollers 31, 35 may be pressure rollers that apply force to the label material. The amount of pressure applied can be varied by moving pressure roller 36 up or down to increase or reduce the amount of release tension or force required to separate the label from the linear material.

While the face stock is separated from the linear material, the amount of time the separation occurs can be varied. The spacing of the rollers 32, 33, 34, 36 can be increased. The longer the rollers are separated the less tension between the adhesive and the silicone as the adhesive has been exposed to air and will begin to cure. To accelerate the drying of the adhesive a fan 39 and/or heater 43 can be use to blow hot air onto the adhesive 2. In addition, the advancing speed of the material can be adjusted in order to reduce or increase the exposure time of the adhesive material 2.

The label stock is then further processed in a conventional manner using a conventional processing machine or apparatus 35. For example, in a manner well known to those of skill in the art of label converting, ink rollers and printing plates may be used to print images on the face stock. The face stock material may be die cut to produce individual labels 56. The labels and linear base layer may be wound onto rolls 52. The rolls of converted labels may be removed from the machine and packaged with the rolls (preferably with the rolls resting on their side) for shipment to the end user.

Figure 5:
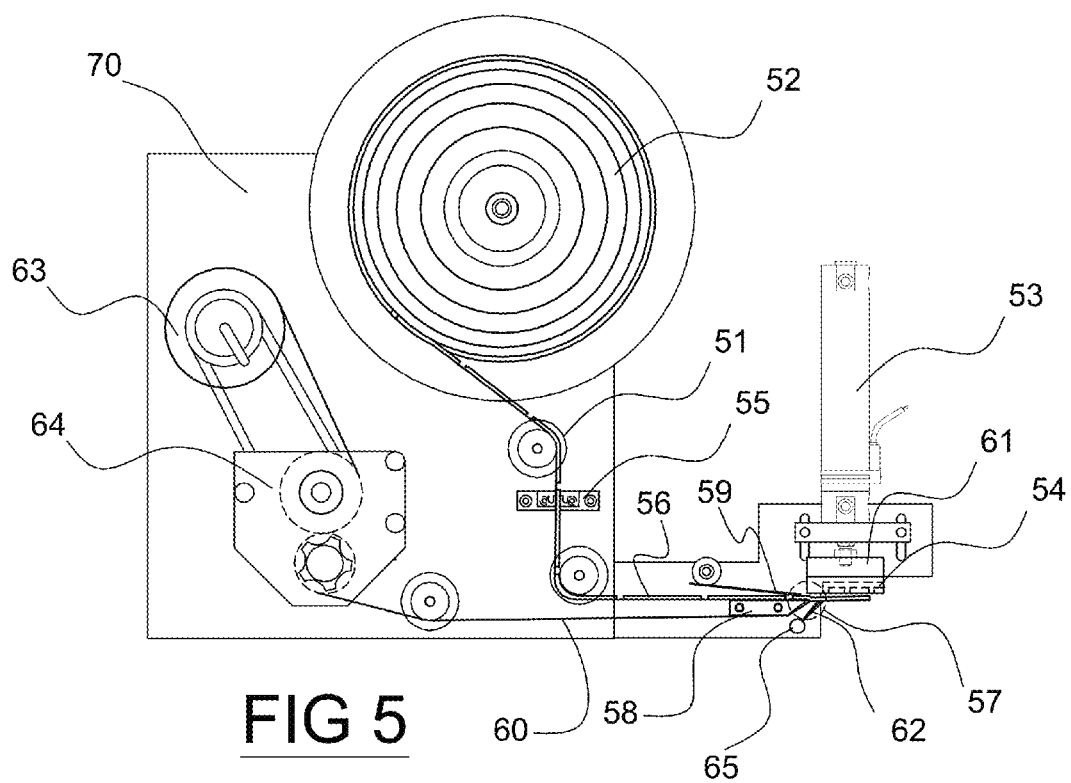
FIG. 5 is a side view of a label applicator dispensing conventional labels.
Figure 6:
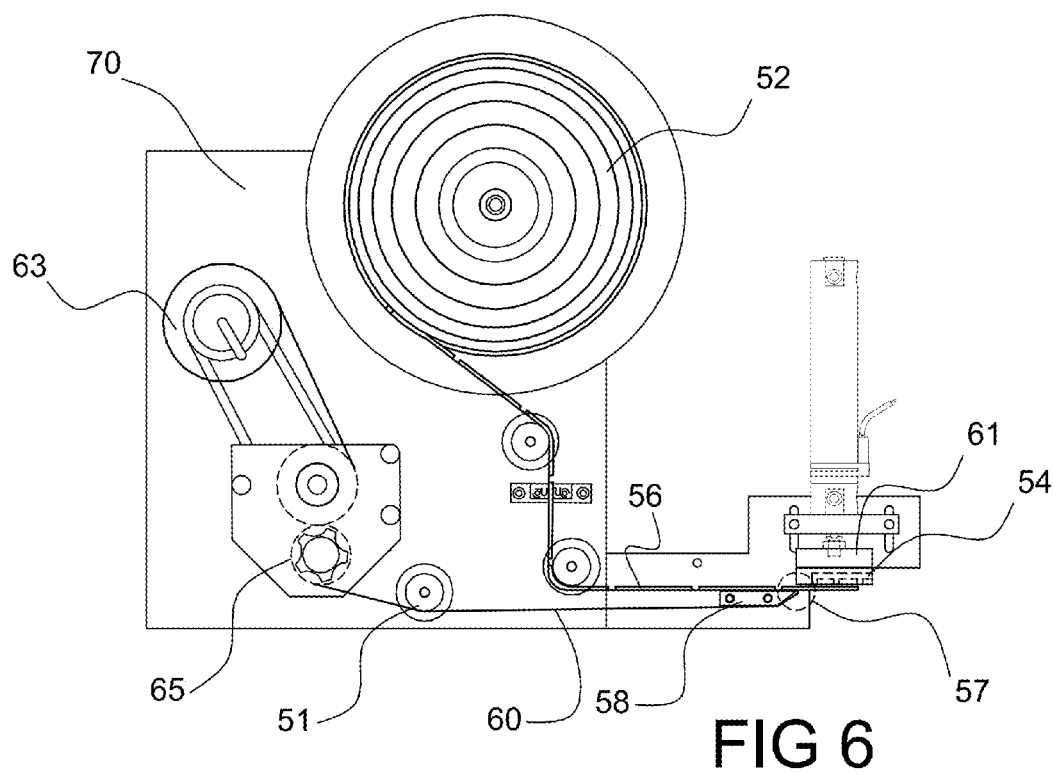
FIG. 6 is a side view of a label applicator dispensing labels according to an embodiment of the invention.

The end user, a label applicator, receives the labels. As can be seen in FIGS. 5 and 6, the rolls of labels are loaded onto a label applicator 70. The labels are threaded through the label applicator around idle rollers 51, through a gap sensor 55, to the peel edge 58. The label applicator may contain additional mechanisms not shown. At the peel edge 58, the labels 56 and linear material 60 are separated. The linear material is threaded around a roller 51 back to the drive. The linear material also passes around a nip roller 65 and a drive roller 64, and through to the take up roller 63. When labels are to be dispensed, the nip roller is positioned against the linear material and the driver roller. When the drive roller 64 rotates, the linear material is pulled back through the machine, causing the labels 56 to be dispensed off the dispense edge and onto a tamp pad 61. The tamp pad may include holes 54 through which a suction force is applied to hold the label onto the pad. The vacuum holes 54 may be dispersed across the pad. The tamp pad 61 may be extended (e.g., downwardly in FIGS. 5 and 6) in order to affix the label to a product. Movement of the tamp pad 61 may be accomplished by using a hydraulic piston/cylinder arrangement 53 or other suitable configuration.

Figure 3:
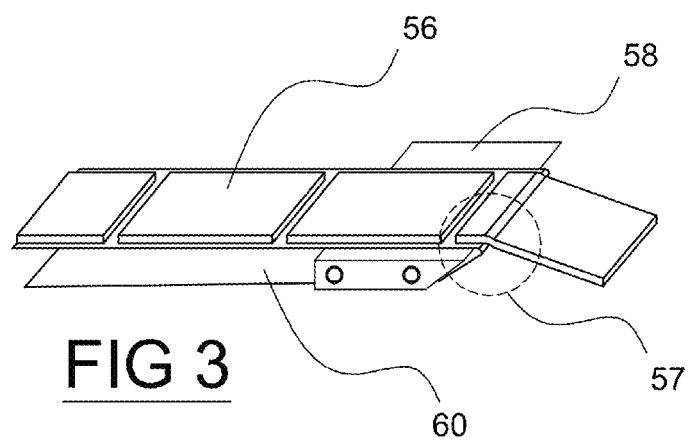
FIG. 3 is a perspective view of a conventional label passing over a peel edge and being separated from the base layer of liner material.

FIG. 6 shows the benefits of the exemplary embodiment described herein. FIG. 5 shows a conventional label applicator having a spring tension plate 59, pressing on the top of the label prior to it being dispensed. The applicator of FIG. 6, may also include an air jet 65, providing a stream of air to 62 to direct the label onto the tamp pad. The air jet 65 is used to prevent the label from not completely separating from the linear material and from starting to follow a similar path as the linear material. FIG. 3 is an enlargement of the problem area 57 in FIG. 5. FIG. 3 shows the label bending around the peel edge 58 in the direction of travel of the linear material 60 due to the relatively strong adhesive forces holding the label stock material and the adhesive to the linear material and the release material (e.g., silicone). The adhesive force can be quantified by testing and determining the release value of the label material.

Figure 4:
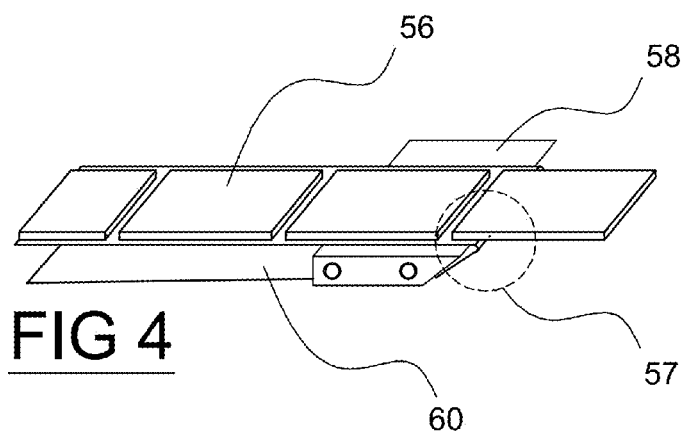
FIG. 4 is a perspective view of a label passing over a peel edge and being separated from the base layer of liner material after having been processed according to an embodiment of the invention.

The innovative system shown in FIG. 6, on the other hand, does not require the tension plate or jet of air. As shown in FIG. 6, the labels 56 consistently and easily release from the linear material 60. As shown in FIG. 4, after process according to the exemplary embodiment described above, the labels dispense flat and smoothly off the linear material at the peel edge.

FIG. 8 discloses a chart of 25 conventional labels removed from a linear material using a release testing machine to measure the release value. The average release value is 26.8 grams with a standard deviation of 5.6 grams. The release value testing procedure is a standard testing procedure published by the Tag and Label Manufactures Institute (TLMI). The release testing is performed using a common Adhesion/Release testing machine, such as model AR-1000 manufactured by ChemInstruments of Fairfield, Ohio, testing to meet ASTM: D 3330 standard. FIG. 9 is a chart of the results of the measured release value of 25 labels using the same release test machine. The labels used for the testing shown in FIG. 9, are labels formed using the process described herein. The average release valve is 19.8 with a standard deviation of 3.3. Thus, as described herein, the label material formed using the separation and recombining process described above, reduces the adhesive force 5 between the adhesive material 2 and silicone 3 by 35%, and results in a consistent overall improvement of the release force of approximately 70%. The improvement is measured by the improvement in the ability for the two layers to separate on an automated high speed label applicator. For those skilled in the art of label applicator manufacturing, this would significantly improve the performance of the machines.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "fore," "aft," "inboard," "outboard," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the converter and applicator machines shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A system for producing a roll of label material with a reduced release value, comprising:
    an initial label roll defined by an adhesive coated portion with a single adhesive coated face joined to a release agent coated portion with a single release agent coated face, the initial label roll defining a first release value;
    a separating apparatus configured to separate the initial label roll into the adhesive coated portion and the release agent coated portion;
    an advancing apparatus configured to maintain the two separated portions apart and advance the portions toward a combining apparatus; and
    the combining apparatus configured to combine the two portions via joining the single adhesive coated face to the single release agent coated face into a final label roll defining a second release value,
    wherein the second release value is lower than the first release value without the addition of any additional agent or agents between the adhesive coated portion and the release agent coated portion.

2. The system of claim 1, where the system is configured so that the speed of advancement of the label material through the advancing apparatus is adjustable.

3. The system of claim 1, wherein the advancing apparatus includes a fan to force air on to at least the adhesive coated portion.

4. The system of claim 1, wherein the advancing apparatus includes a heat producing device for applying heat to at least the adhesive coated portion.

5. The system of claim 1, wherein the combining apparatus includes a pair of rollers, wherein each of the rollers is located on an outboard side of one of the two separated portions so that the combined portions pass between the pair of rollers.

6. The system of claim 5, wherein a force applied by at least one of the pair of rollers on the two separated portions is adjustable.

7. The system of claim 1, wherein the separation apparatus includes a pair of separation rollers, a first separation roller urges the adhesive coated portion of the initial label roll in the direction of the combining apparatus via the advancing apparatus and a second separation roller urges the release agent coated portion of the initial label roll in the direction of the combining apparatus via the advancing apparatus.

8. The system of claim 7, wherein the advancing apparatus further comprises first and second adhesive coated portion rollers and first and second release agent coated portion rollers, wherein the adhesive coated portion is urged in the direction of the combining apparatus via the first and second adhesive coated portion rollers, and wherein the release agent coated portion is urged in the direction of the combining apparatus via the first and second release agent coated portion rollers.

9. The system of claim 8, where the system is configured so that the speed of advancement of the label material through the advancing apparatus is adjustable.

10. The system of claim 8, wherein the advancing apparatus includes a fan to force air on to at least the adhesive coated portion.

11. The system of claim 8, wherein the advancing apparatus includes a heat producing device for applying heat to at least the adhesive coated portion.

12. The system of claim 8, wherein the combining apparatus includes a pair of combining rollers, wherein each of the combining rollers is located on an outboard side of one of the two separated portions so that the combined portions pass between the pair of combining rollers.

13. The system of claim 12, wherein a force applied by at least one of the pair of combining rollers on the two separated portions is adjustable.

14. The system of claim 13, wherein the force applied by at least one of the pair of combining rollers on the two separated portions is adjustable by moving at least one of the pair of combining rollers closer or further away from the other of the pair of combining rollers.

* * * * *